William W. Mills, Jr. INVENTOR.

March 19, 1968     W. W. MILLS, JR     3,374,350
ALIGNMENT CHECKING DEVICE FOR PENETRATING
RADIATION PHOTOGRAPHY APPARATUS
Filed Dec. 21, 1964     2 Sheets-Sheet 2
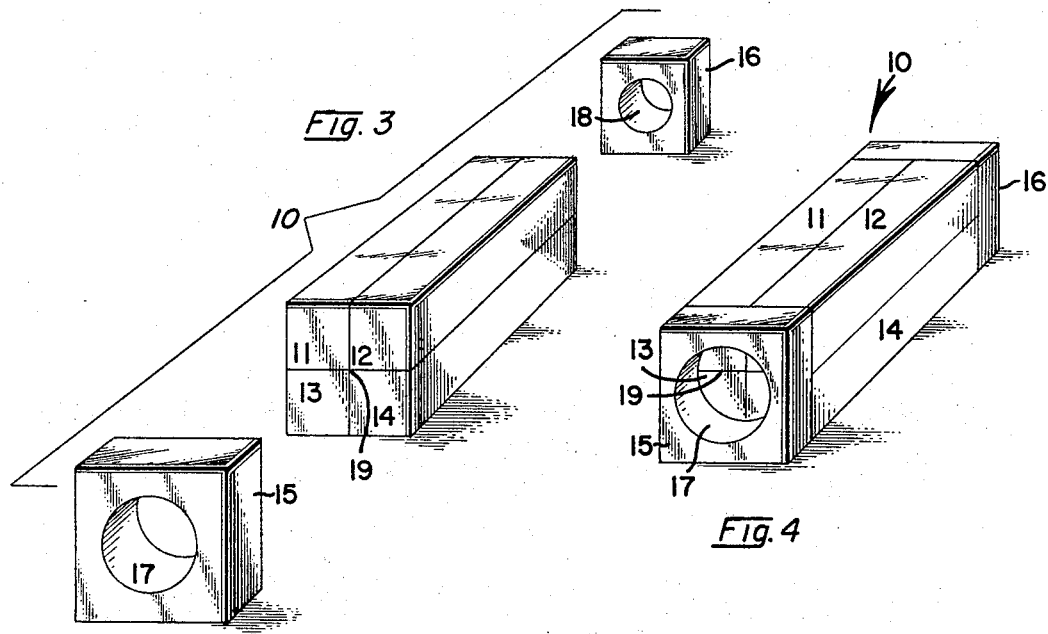
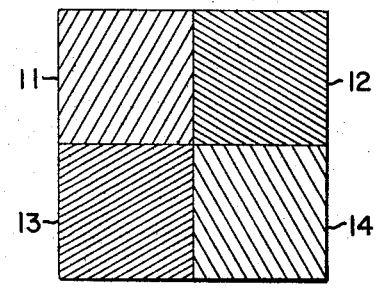
William W. Mills Jr. INVENTOR.
BY
ATTORNEY

3,374,350
ALIGNMENT CHECKING DEVICE FOR PENETRATING RADIATION PHOTOGRAPHY APPARATUS
William W. Mills, Jr., Huntsville, Ala., assignor to Thiokol Chemical Corporation, Bristol, Pa., a corporation of Delaware
Filed Dec. 21, 1964, Ser. No. 419,771
3 Claims. (Cl. 250—65)

ABSTRACT OF THE DISCLOSURE

In instrument for aligning a beam from a penetrating radiation source with a rocket motor to be analyzed and a recording device to determine what effects have been caused to the rocket motor by age, temperature ranges and other compatible conditions.

---

This invention relates to improvements in devices that are utilized to align a beam from a penetrating radiation source with an object to be analyzed and, more particularly, to a device that will align the beam of the penetrating radiation source with a solid propellant rocket motor so that substantially identical areas thereof can be repeatedly examined during certain time intervals to determine if age, temperature ranges and other conditions have affected such areas during the non-destructive testing of the rocket motor.

Non-destructive testing encompasses many methods of analyzing the structure of an object or material to determine serviceability, durability and destructability without causing damage. By this manner of testing, an evaluation of the characteristics that will affect the performance of the item tested may be accomplished. One of the non-destructive tests that may be instigated is the subjection of an object or material under test to a beam from a penetrating radiation source to determine what effect age, temperature ranges or other conditions will have on the object or material being tested. Thus, any change that will occur during the period of the test will form the basis for the evaluation of the object or material being tested. For example, any defects that may occur during the non-destructive testing of a rocket motor may be evaluated by repetitive radiological observations of substantially identical areas of the rocket motor that are subjected to the penetrating radiation beams. It is important, therefore, that the areas to be analyzed be substantially identical and repeatedly determined over a predetermined period of time.

One of the principal requirements of a non-destructive test is the ability to reveal discontinuity of the internal regions of substantially identical areas of an object or a material. If, therefore, substantially identical areas to be examined can not repeatedly be identified, the test will fail and the evaluation of the test will not be as exact and successful as to the conclusions that are required from such evaluation. Thus, the quality of materials, as to their serviceability, durability and destructability, can be predicted as the result of such testing. These are important features that must be considered in a rocket motor, and it is only by such testing that the evaluation of the rocket motor can be definitely determined. The subjection of a rocket motor to a beam from a penetrating radiation source is of primary interest at the present time for it is by this type of testing that the nature of any defect of the rocket motor that exists may be determined.

It is an object of the present invention, therefore, to provide a device that will definitely align or portray the alignment of the penetrating radiation beam with an X-ray sensitive so that substantially identical areas, defined by the beam, in any object or material may be repeatedly subjected to the beam over predetermined time periods so that an analysis of the substantially identical areas that are recorded can be made by a comparison of the recording medium depicting such area that is taken over such time periods.

The radiographic density of the object or material to be subjected to the beam must be properly determined, for it is important that the device embodying the invention have suitable workable dimensions and be made of a material having the same energy level and radiographic density or there is, at the most, only a 10% variation between the radiographic density of the object or material and the fabricated device. This also involves varying the size of the device as the size of the object or material varies or the material from which the device is fabricated changes the radiographic density thereof.

It is, therefore, a well-established fact that exact alignment of the beam from the penetrating radiation source with respect to the object or material being examined can be achieved to provide duplication records of substantially identical areas to determine the proper geometric layout of the object or material being tested. Thus, duplicate records of the substantially identical areas being examined can be executed during predetermined time periods.

Substantial variations in the recording medium of substantially identical areas will, as previously stated, affect the evaluation of the examination of the object or material; thus the instant device was provided to eliminate any such substantial variations in the examination of the substantially identical areas.

For example, X-rays may be taken of a rocket motor before the solid propellant cast therein has been cured. Additional X-ray shots may then be taken after curing. After subjection to variations in temperature ranges and after other conditions have been imposed on the rocket motor, such as load tests, etc., and it is imperative that the identical area which is the subject of the first X-ray shot be the same substantially identical area that is examined by future X-ray shots.

Thus, the provision of a device, such as contemplated by the instant invention, is imperative to assure the proper alignment of the beam from a penetrating radiation source so that substantially the same identical areas under examination are subjected to the beam during the entire period of testing to which the object or material is subjected.

With the above and other objects and advantages in view, the invention consists of the novel utilization and construction thereof as will be more fully described, claimed and illustrated in the accompanying drawings in which:

FIGURE 3 is a perspective exploded view of the device more clearly illustrating the component parts thereof.

FIGURE 4 is a perspective view of the device showing it in assembled form, and

FIGURE 5 is an enlarged transverse cross-sectional view of the device of FIGURE 4.

Figure 1:
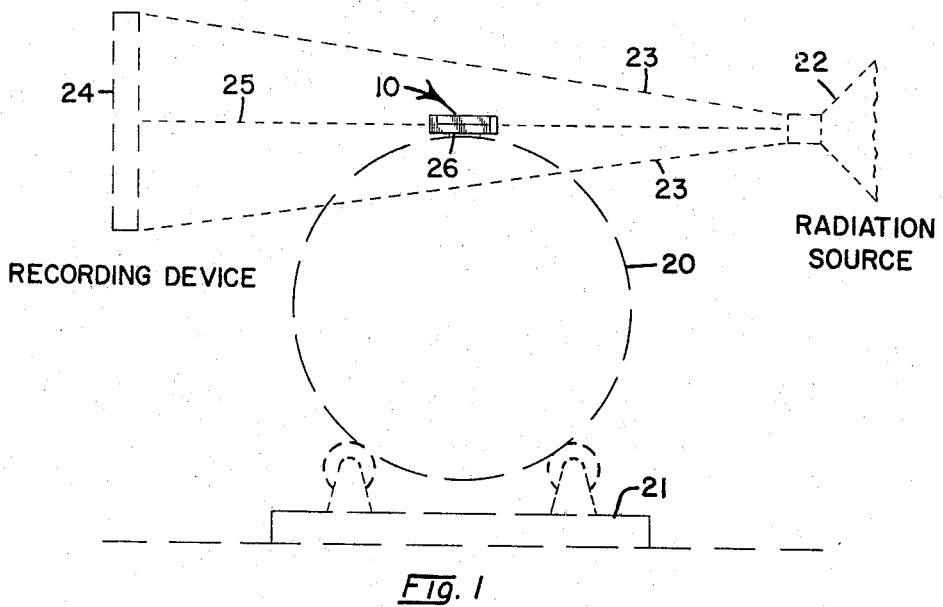
FIGURE 1 is a schematic view illustrating the manner in which the device embodying the invention is utilized when a beam from an X-ray machine is projected through a solid rocket motor onto a film positioned in a film holder.

Referring more in detail to the drawings wherein like parts are designated by like reference numerals, the reference numeral 10 is used to generally designate an alignment checking device embodying the invention.

The device 10 comprises four rectangular-shaped bar members 11, 12, 13 and 14 and a pair of end-capping plates 15 and 16. The capping plate 15 has a centrally-located aperture 17 therein while the capping plate 16 has a centrally-located aperture 18 therein. Under certain conditions, i.e., when the distance between an X-ray machine and the film is increased because of prevailing conditions, i.e., size of the rocket motor, available means for supporting the film holder and the X-ray machine, the diameter of one of the apertures may be slightly increased.

In assembling the device, the outer surface of the bar members 11, 12, 13 and 14 are expertly machined so that the contact of the nested surfaces of the bar members 12, 13 and 14, when positioned in contact with each other, are as neat as it is possible to achieve. The overall length of the device 10 is divided into tenths so that each of the capping plates 15 and 16 are each one-tenth of the length and the bar members 11, 12, 13 and 14 are eight-tenths of the total length. The capping plates 15 and 16 are as expertly machined as the bar members 11, 12, 13 and 14 so that the contact of the surface of the capping plates 15 and 16 with the end surfaces of the bar members 11, 12, 13 and 14 are as neat as it is possible to achieve. To date, it has been determined that, for the smallest rocket motor to be X-rayed, the bar members 11, 12, 13 and 14 should be no less than one-inch and for the largest not longer than 24 inches.

It will be noted that, in cross-section, the members 11, 12, 13 and 14 form a square, and the capping plates 15 and 16 are also square in cross-section so that the outer surfaces of the capping plates 15 and 16 are contiguous with the outer surfaces of the bar members 11, 12, 13 and 14.

In examining FIGURES 3 and 4, it will be noted that the demarcation lines outlining the peripheral edges of the bar members 11, 12, 13 and 14 depict or form, as at 19, what is commonly referred to as "cross-hairs"; and such a formation is always visible in an X-ray film regardless of how close a contact is made between the nested outer surfaces of the bar members 11, 12, 13 and 14 provided the penetrating radiation beam angle is aligned with the bar members within approximately ½ degree.

In the schematic views 1 and 2, the manner of use of the device 10 is graphically depicted. A rocket motor 20 is mounted on a suitable support 21 so that it can be rotated as required. An X-ray machine 22 is mounted by any suitable support so that a beam 23 projected from the X-ray machine 22 will be received on a film positioned in a conventional film holder 24 that is also suitably supported so that an axial path of projection 25 may be used to pass through the device 10 and properly align the X-ray machine 22 with that portion of the rocket motor 20 that is to subjected to the beam 23.

Figure 2:
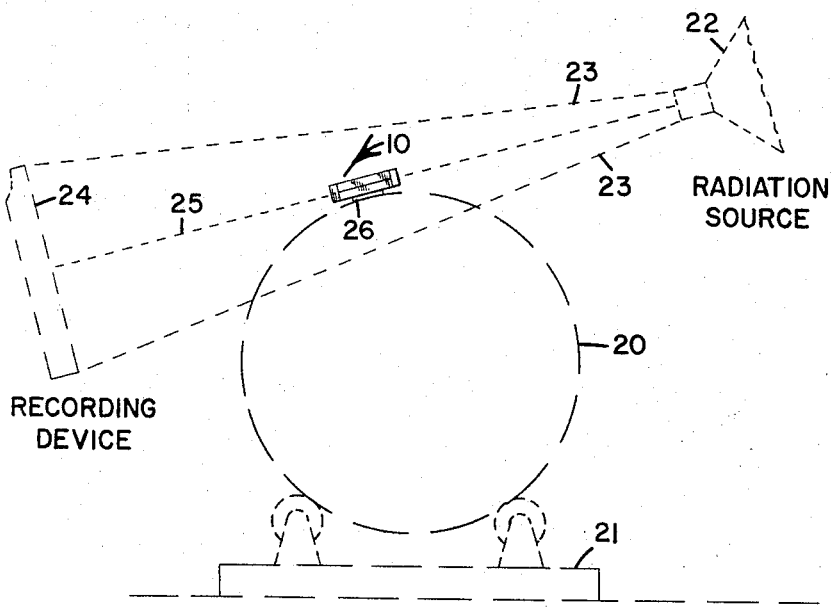
FIGURE 2 is a view, similar to FIGURE 1, but illustrating another angle of projection of the beam from the X-ray machine.

The components of the device 10 may be retained in position by the use of magnets, magnetism, a suitable sticky tape or a tacky adhesive, any of which may be utilized as are available. In FIGURES 1 and 2, such a securing means is shown at 26.

When the X-ray film has been developed, an image of the device will appear thereon and subsequent films can be compared with the first-developed film to determine if the beam 23 from the X-ray machine 22 has been properly located. Also, when the first film is developed, the exact location of the device 10 with relation to the motor 20 is identified so that, when subsequent films are developed, the positioning of the device 10 can be properly monitored in relation to the beam 23.

Because of the location of the device 10, a clear cut image always appears on the developed film; and it is the only one of many devices that have been used that fully meets the requirements that are necessary in the testing of the rocket motor 20.

The device can be retained in various positions, as depicted in FIGURES 1 and 2, and the rocket motor 20 may also be rotated, as previously stated, so that all areas of the rocket motor 20 are available for X-ray thereof.

It is believed that, from the foregoing description, the manner of use and manner of construction of the invention will be clear to those skilled in the art; and it is to be understood that variations therein may be adhered to provided such variations fall within the spirit of the invention and the scope of the appended claims.

Having thus described the invention, what is claimed as new and desired to be secured by Letters Patent is:

1. An alignment checking device for aligning the beam of a penetrating radiation source with a recording medium while an object on which the device is mounted is being subjected to the beam, comprising at least four bar members at least two flat sides which intersect at right angles and have identical overall dimensions throughout, said bar members are positioned in nested longitudinal contact with each other so that the right angularly disposed sides of all four bar members abut at a line which is common to all of them, and capping plates positioned in contact with the opposite end surfaces of said bar members so that the outer edges of said capping plates are contiguous with the outer surfaces of said bar members.

2. An alignment checking device, as in claim 1, wherein each of said capping plates is provided with a centrally-located aperture and the right angularly disposed sides of all four bar members at their common line of abutment provide a cross-hairs arrangement within each of said apertures.

3. An alignment checking device, as in claim 2, wherein one of the apertures in said capping plates may be larger than the aperture in the other of said capping plates.

References Cited

UNITED STATES PATENTS

| 2,344,823 | 3/1944 | Landis et al. | 250—67 |
| 3,001,070 | 9/1961 | Davis et al. | 250—67 |
| 3,111,582 | 11/1963 | Levi | 250—67 |

RALPH G. NILSON, *Primary Examiner.*

A. L. BIRCH, *Assistant Examiner.*